(12) United States Patent
Nakaya

(10) Patent No.: US 12,053,951 B2
(45) Date of Patent: Aug. 6, 2024

(54) MULTILAYER ARTICLE SUITABLE FOR USE AS A FUEL CONTAINER

(71) Applicant: KURARAY CO., LTD., Kurashiki (JP)

(72) Inventor: Masakazu Nakaya, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 265 days.

(21) Appl. No.: 16/727,481

(22) Filed: Dec. 26, 2019

(65) Prior Publication Data

US 2020/0207052 A1   Jul. 2, 2020

Related U.S. Application Data

(60) Provisional application No. 62/784,898, filed on Dec. 26, 2018.

(51) Int. Cl.
| | | |
|---|---|---|
| *B32B 1/00* | (2024.01) | |
| *B29C 41/04* | (2006.01) | |
| *B65D 61/00* | (2006.01) | |
| *C09D 129/06* | (2006.01) | |

(52) U.S. Cl.
CPC .............. *B32B 1/00* (2013.01); *B29C 41/042* (2013.01); *B65D 61/00* (2013.01); *B32B 2274/00* (2013.01); *C09D 129/06* (2013.01)

(58) Field of Classification Search
None
See application file for complete search history.

(56) References Cited

U.S. PATENT DOCUMENTS

| | | | | |
|---|---|---|---|---|
| 5,034,281 A | * | 7/1991 | Kawasaki | B32B 27/28 |
| | | | | 428/522 |
| 5,156,783 A | * | 10/1992 | Seizert | C08J 7/14 |
| | | | | 264/83 |
| 5,202,161 A | * | 4/1993 | Seizert | C08J 7/14 |
| | | | | 264/83 |
| 5,214,147 A | * | 5/1993 | Kazmierczak | C07D 211/58 |
| | | | | 546/244 |
| 5,344,038 A | * | 9/1994 | Freeman | B29C 70/342 |
| | | | | 220/62.22 |
| 6,737,132 B1 | | 5/2004 | Michihata et al. | |
| 6,946,176 B2 | | 9/2005 | Jousse et al. | |
| 8,597,747 B2 | | 12/2013 | Spence et al. | |
| 2004/0020547 A1 | * | 2/2004 | Mahabir | B82Y 30/00 |
| | | | | 138/137 |
| 2004/0096683 A1 | * | 5/2004 | Ikeda | B29B 9/12 |
| | | | | 428/476.3 |
| 2015/0151630 A1 | * | 6/2015 | Bethea | C23C 28/042 |
| | | | | 220/562 |
| 2017/0183493 A1 | * | 6/2017 | Okamoto | C08J 5/18 |
| 2017/0268175 A1 | * | 9/2017 | Kawagoe | D21H 23/22 |
| 2018/0016430 A1 | * | 1/2018 | Shibutani | C08L 23/26 |
| 2018/0105615 A1 | * | 4/2018 | Kawamoto | C08F 8/12 |
| 2019/0100610 A1 | * | 4/2019 | Sato | C08F 210/02 |
| 2019/0202182 A1 | * | 7/2019 | Hirose | B32B 27/304 |
| 2019/0203005 A1 | * | 7/2019 | Hirose | B32B 27/40 |
| 2019/0232622 A1 | * | 8/2019 | Suzuki | B65D 65/40 |
| 2020/0180279 A1 | * | 6/2020 | Chow | B65D 65/40 |
| 2021/0292502 A1 | * | 9/2021 | Fukuhara | B32B 27/306 |

\* cited by examiner

*Primary Examiner* — Kevin R Kruer

(74) *Attorney, Agent, or Firm* — Oblon, McClelland, Maier & Neustadt, L.L.P.

(57) ABSTRACT

A multilayer article is provided which is suitable for use in making (or as) a fuel container by rotational molding, wherein the multilayer article has at least one layer of a thermally cured polymer composition and another layer of a barrier polymer composition, wherein the barrier polymer composition comprises a specified modified ethylene-vinyl alcohol copolymer as a barrier polymer.

16 Claims, No Drawings

MULTILAYER ARTICLE SUITABLE FOR USE AS A FUEL CONTAINER

CROSS-REFERENCE TO RELATED APPLICATION

This application claims priority under 35 U.S.C. § 119 from U.S. Provisional Application Ser. No. 62/784,898, filed 26 Dec. 2018, the disclosure of which is incorporated by reference herein for all purposes as if fully set forth.

FIELD OF THE INVENTION

The present invention relates to a multilayer article having at least one layer of a thermally cured polymer composition (thermally cured polymer layer) and another layer of a barrier polymer composition (barrier layer), wherein (i) the barrier polymer composition comprises a modified ethylene-vinyl alcohol copolymer with (a) an ethylene content from about 18 to about 55 mol % and (b) modified with a group containing at least one pendant primary hydroxyl group; (ii) the melt temperature of the barrier polymer composition is less than about 160° C. The multilayer article is desirably prepared by rotational molding and is suitable for use in making (or as) a fuel container.

BACKGROUND OF THE INVENTION

Ethylene-vinyl alcohol copolymers ("EVOH") are excellent in transparency, gas barrier properties and organic solvent barrier properties, including fuel barrier property, flavor retention, solvent resistance, oil resistance and the like. As a result, they find wide use including various packaging containers, such as food packaging containers and fuel containers.

In recent years, coextrusion blow-molded containers made of plastic materials are preferably used as containers for storing fuels. Polyethylene is a common and low cost plastic material, but a stored liquid fuel (such as gasoline) and/or the vaporized fuel easily permeates through the polyethylene walls into the atmosphere. As U.S. Pat. No. 6,737,132B1 describes, co-extrusion blow-molded containers made of plastic materials including EVOH are preferably used to reduce fuel permeation through the container.

A barrier plastic fuel tank produced by rotational molding process is also preferably used. This process typically uses a dropbox, which is attached to the mold, to store and then release a second charge of material into the mold at a critical temperature during the molding cycle. Compared with blow molding, it is known that a tank produced by rotational molding has uniform thickness and excellent strength. U.S. Pat. No. 6,946,176B2 and U.S. Pat. No. 8,597,747B2 describe a multilayer rotationally molded fuel tank which comprises EVOH for improved fuel barrier properties.

In the rotational molding industry, to prepare a multilayered fuel tank containing EVOH, first crosslinkable polyethylene powder is molded and crosslinked to form a layer comprising a crosslinked polyethylene ("PEX"), then EVOH powder is added and molded, and crosslinkable polyethylene powder is added thereafter and crosslinked again to form a PEX/EVOH/PEX structure fuel tank. Crosslinking prevents molecules from sliding over one another over long times, thus minimizing creep and greatly increasing stress crack resistance.

The curing temperature and time of the heating cycle are critical to determine performance of the thermally cured polymer such as PEX. If the curing temperature is low and/or the curing time is short, sufficient crosslink is not achieved, which may cause insufficient creep resistance. If over-curing has occurred due to high curing temperature and/or long curing time, the thermally cured polymer may lose its mechanical properties due to degradation of the polymer chain.

In order to control reaction for ideal crosslink in the PEX layer, processing conditions for the EVOH layer is also critical. Even though the processing condition for the PEX is optimized, if the following EVOH processing condition is severe for the PEX, degradation of the PEX may occur during the EVOH processing. Typical melt temperature of crosslinked polyethylene is around 100-140° C., while the melt temperature of conventional EVOH is around 160-190° C., depending on ratio of ethylene unit and vinyl alcohol unit. Considering favorable processing condition for PEX, closer melt temperature between EVOH and polyethylene is desirable. In other words, an EVOH with lower melt temperature may be desirable.

It is known that EVOH with higher ethylene content and/or lower degree of saponification yields lower melt temperature. However, such EVOH has inferior barrier property compared with the EVOH with lower ethylene content and/or higher degree of saponification. It has, therefore, been difficult to achieve both good processability, strength and excellent barrier resistance properties required for fuel tank application when using conventional EVOH.

The prior art, however, does not suggest the use of a rotational molding fuel tank made of both a modified EVOH (as described below) and PEX, nor does the prior art teach that the lower melt temperature of such a modified EVOH could yield a better curing condition for a PEX layer in a rotationally molded fuel container without sacrificing fuel barrier property.

SUMMARY OF THE INVENTION

In view of the above background, an object of the present invention is to provide a multilayer article having excellent barrier properties and processability for both EVOH and a thermally cured polymer which are comprised in the multilayer article.

The multilayer article of the present invention is particularly suitable for use of fuel container formed by rotational molding process.

The present invention addresses the above-described problem by providing a multilayer article comprising at least one layer of a thermally cured polymer composition (B) and another layer of a barrier polymer composition (A), wherein:
 (i) the barrier polymer composition (A) comprises a modified ethylene-vinyl alcohol copolymer as a barrier polymer, wherein the modified ethylene-vinyl alcohol copolymer possesses (a) an ethylene content from about 18 to about 55 mol %, and (b) a modifying group containing at least one pendant primary hydroxyl group;
 (ii) the melt temperature of the barrier polymer composition (A) is less than about 160° C. (measured as set forth in the Examples);
 (iii) the thermally cured polymer composition (B) comprises a thermally cured polymer.

In one embodiment, a monolayer film prepared from the barrier polymer composition (A) exhibits an oxygen permeability that is less than about 3.2cc.20 micron/m2.day.atm (measured as set forth in the Examples).

In another embodiment, the modifying group containing at least one pendant primary

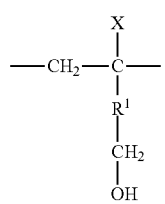

hydroxyl group is represented by formula (I):
wherein X is selected from hydrogen, a methyl group and a hydroxyalkyl group represented by the formula $R^2$—OH; and $R^1$ and $R^2$ are individually selected from a direct bond, an alkylene group having a carbon number of from 1 to 9, and an alkyleneoxy group having a carbon number of from 1 to 9. The above alkylene and alkyleneoxy group may optionally contain one or more pendant hydroxyl groups, alkoxy groups and/or halogens.

In one specific embodiment, $R^1$ is a direct bond and X is a hydroxymethyl group. In another embodiment, content of this modified group based on the total monomer units is from about 0.05 to about 20 mol %.

In another specific embodiment, $R^1$ is hydroxymethylene and X is hydrogen. In another embodiment, content of this modified group based on the total monomer units is from about 0.1 to about 20 mol %.

In another specific embodiment, $R^1$ is methyloxymethylene and X is hydrogen. In another embodiment, content of this modified group based on the total monomer units is from about 0.1 to about 20 mol %.

In another embodiment, the said multilayer article is formed by rotational molding process.

In another embodiment, the thermally cured polymer is a thermally crosslinked polyethylene.

In another embodiment, the rotational molded container is used for fuel container.

In another embodiment, the melt flow rate (MFR) (190° C., 2160 g load) of the modified ethylene-vinyl alcohol copolymer is more than about 4.2 g/10 minutes (measured as set forth in the examples).

According to other aspects of the present invention, a multilayer sheet is provided that is superior in barrier properties and processability for both EVOH and thermally cured polymer which are comprised in the multilayer article. It is particularly suitable for use as fuel container formed by rotational molding process.

These and other embodiments, features and advantages of the present invention will be more readily understood by those of ordinary skill in the art from a reading of the following detailed description.

DETAILED DESCRIPTION

The present invention relates to a multilayer article having at least one layer of a barrier polymer composition comprising a modified ethylene-vinyl alcohol copolymer and another layer of a thermally cured polymer composition. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a mass or weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Polymer

Polymers used for the present invention include a modified EVOH resin (a) (for barrier polymer composition (A)) and a thermally cured polymer (b) (for thermally cured polymer composition (B)). Further details are provided below. Other polymers may also be used as long as not inhibiting the effects of the present invention.

Modified EVOH Resin (a)

The barrier layer composition (A) of a multilayer article in accordance with the present invention comprises a modified EVOH resin (a). The modified EVOH resin (a) is modified with group containing a primary hydroxyl group in addition to an ethylene unit and a vinyl alcohol unit as a main structural unit. By the presence of the modified group as described herein, melt temperature is significantly decreased without significant deterioration of barrier properties.

The modified EVOH resin (a) desirably has, as a lower limit of ethylene unit content (a proportion of the number of ethylene units to the total number of monomer units in the modified EVOH resin (a)), an ethylene unit content of about 18 mol % or greater, or about 20 mol % or greater, or about 22 mol % or greater. On the other hand, the modified EVOH resin (a) desirably has, as an upper limit of ethylene unit content, an ethylene unit content of about 55 mol % or less, or about 52 mol % or less, or about 50 mol % or less. The modified EVOH resin (a) having an ethylene unit content of no less than the lower limit and no greater than upper limit gives an excellent oxygen barrier and gives excellent melt processability.

The modified EVOH resin (a) typically has, as a lower limit of degree of saponification (a proportion of the number of vinyl alcohol units to the total number of the vinyl alcohol units and vinyl ester units in the modified EVOH resin (a)), a degree of saponification of about 80 mol % or greater, or about 95 mol % or greater, or about 99 mol % or greater. On the other hand, the modified EVOH resin (a) typically has, as an upper limit of degree of saponification, a degree of saponification of (substantially) 100 mol %, or about 99.99 mol % or less. The modified EVOH resin (a) having a degree of saponification of no less than the lower limit gives excellent oxygen barrier properties and thermal stability.

The modified EVOH resin (a) typically has, as a lower limit of a melt flow rate (a measured value at a temperature of 190° C. and a load of 2160 g in accordance with JIS K7210) of about 0.1 g/10 min or more, or about 0.5 g/10 min or more, or about 1 g/10 min or more. In case the modified EVOH resin (a) is processed by rotational molding process, a melt flow rate of about 4.2 g/10 min or more is preferred.

The modified EVOH resin (a) preferably has been modified with a group containing primary hydroxyl group, as represented by formula (I). By the presence of the modified group represented by formula (I), melt temperature is significantly decreased without sacrificing barrier properties.

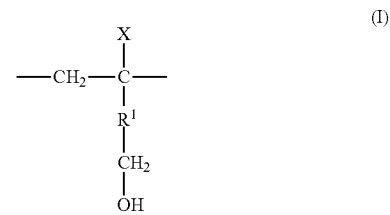

wherein X is selected from hydrogen, a methyl group and a hydroxyalkyl group represented by the formula $R^2$—OH; and $R^1$ and $R^2$ are individually selected from a direct bond, an alkylene group having a carbon number of from 1 to 9, and an alkyleneoxy group having a carbon number of from 1 to 9. The above alkylene and alkyleneoxy group may optionally contain one or more pendant hydroxyl groups, alkoxy groups and/or halogens.

In the formula (I), X is preferably either hydrogen or hydroxyl alkyl group represented by the formula $R^2$—OH, more preferably hydroxyl alkyl group represented by $R^2$—OH.

In the formula (I), $R^1$ and $R^2$ are preferably an alkylene group or alkoxylene group having a carbon number of from 1 to 5, more preferably alkylene group or alkoxylene group having a carbon number of from 1 to 3.

As embodiment of the chemical structure represented by formula (I), for example, the chemical structures represented by formula (II), formula (III) and formula (IV) are shown.

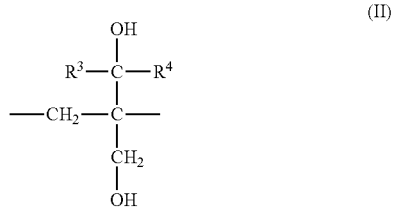

(II)

In formula (II), $R^3$ and $R^4$ independently denote hydrogen or alkyl group, with $R^3$ and $R^4$ collectively having a carbon number of from 1 to 9, and the above mentioned alkyl group may contain hydroxyl group, alkoxy group or halogen.

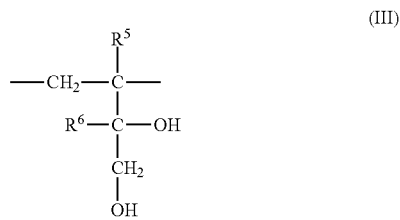

(III)

In formula (III), $R^5$ is X, and $R^6$ is hydrogen, an alkylene group having a carbon number of from 1 to 8, and an alkyleneoxy group having a carbon number of from 1 to 8.

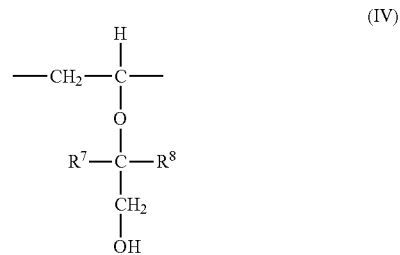

(IV)

In formula (IV), $R^7$ and $R^8$ independently denote hydrogen, aliphatic hydrocarbon group having a carbon number of from 1 to 8, alicyclic hydrocarbon group having a carbon number of from 1 to 3, aromatic hydrocarbon group having a carbon number of from 6 to 8, or a hydroxyl group. Partial or all hydrogen of the above mentioned aliphatic hydrocarbon group having a carbon number of from 1 to 8, alicyclic hydrocarbon group having a carbon number of from 1 to 3 or aromatic hydrocarbon group having a carbon number of from 6 to 8 may be substituted by hydroxyl group, alkoxy group, carboxyl group or halogen.

In one embodiment of formula (I), R1 is preferably a direct bond and X is preferably hydroxymethyl group ($R^3$ and $R^4$ in formula (II) is hydrogen). The modified EVOH resin (a) has, as a lower limit of content of the modified group with primary hydroxyl group, a content of the modified group with primary hydroxyl group of about 0.05 mol % or greater, or about 0.1 mol % or greater, or about 0.4 mol % or greater, or about 1.0 mol % or greater. On the other hand, the modified EVOH resin (a) typically has, as an upper limit of content of the modified group with primary hydroxyl group, a content of the modified group with primary hydroxyl group of about 20 mol % or less, or about 10 mol % or less, or about 8 mol % or less, or about 5 mol % or less. The modified EVOH resin (a) having content of the modified group with primary hydroxyl group of no less than the lower limit and no more than the upper limit gives decrease of melt temperature without deterioration of barrier property.

In another embodiment of formula (I), R1 is preferably hydroxymethylene and X is preferably hydrogen ($R^5$ and $R^6$ in formula (III) is hydrogen). The modified EVOH resin (a) has, as a lower limit of content of the modified group with primary hydroxyl group, a content of the modified group with primary hydroxyl group of about 0.1 mol % or greater, or about 0.4 mol % or greater, or about 1.0 mol % or greater. On the other hand, the modified EVOH resin (a) typically has, as an upper limit of content of the modified group with primary hydroxyl group, a content of the modified group with primary hydroxyl group of about 20 mol % or less, or about 10 mol % or less, or about 8 mol % or less, or about 5 mol % or less. The modified EVOH resin (a) having content of the modified group with primary hydroxyl group of no less than the lower limit and no more than the upper limit gives decrease of melt temperature without deterioration of barrier property.

In another embodiment of formula (I), R1 is preferably a methyloxymethylene group and X is preferably hydrogen. In the above mentioned methyloxymethylene group, oxygen atom is bonded to carbon atom in polymer main chain. In other words, $R^7$ and $R^8$ in formula (IV) are preferably hydrogen. The modified EVOH resin (a) has, as a lower limit of content of the modified group with primary hydroxyl group, a content of the modified group with primary hydroxyl group of about 0.1 mol % or greater, or about 1.0 mol % or greater, or about 2.0 mol % or greater. On the other hand, the modified EVOH (a) typically has, as an upper limit of content of the modified group with primary hydroxyl group, a content of the modified group with primary hydroxyl group of about 20 mol % or less, or about 15 mol % or less, or about 10 mol % or less. The modified EVOH resin (a) having content of the modified group with primary hydroxyl group of no less than the lower limit and no more than the upper limit gives decrease of melt temperature without deterioration of barrier property.

The modified EVOH resin (a) may be a blend of multiple modified EVOH or EVOH as long as it has required properties. In this case, content of each monomer unit, degree of saponification and melt flow rate of the modified EVOH resin (a) is average number calculated by blend ratio.

Other Components in Barrier Polymer Composition (A)

It is possible to make the barrier polymer composition (A) by blending another component. For example, it is possible to make the barrier polymer composition (A) that has thermoplastic resins other than the modified EVOH resin (a) or EVOH, plasticizers, lubricants, stabilizers, surfactants, colorants, ultraviolet absorbers, antistatic agents, desiccants, crosslinkers, metal salts, fillers, reinforcing agents such as various fibers, and the like blended therein. The barrier polymer composition (A) should contain not more than 30% of the another component, or not more than 20% of the another component, or not more than 10% of the another component, or not more than 5% of the another component.

Among all, it is preferred that the barrier polymer composition (A) contains an alkali metal salt. Although the cationic species of the alkali metal salt is not particularly limited, it is preferably sodium salt or and potassium salt. The anionic species of the alkali metal salt is also not particularly limited. It is possible to add as salt of carboxylic acid, salt of carbonic acid, salt of hydrogencarbonic acid, salt of phosphoric acid, salt of hydrogenphosphoric acid, salt of boric acid, hydroxide, and the like. It is preferred that an alkali metal salt content in the barrier polymer composition (A) is from about 10 to about 500 ppm in terms of alkali metal element. The interlayer adhesion may be insufficient in a case that the alkali metal salt content is less than about 10 ppm, and it is more preferably not less than about 50 ppm. In contrast, the melt stability may be insufficient in a case that the alkali metal salt content is more than about 500 ppm, and it is more preferably not more than about 300 ppm.

It is also preferred that the barrier polymer composition (A) contains a phosphoric acid compound. By making a resin composition containing a phosphoric acid compound in such a manner, it is possible to prevent coloration during melt molding. The phosphoric acid compound used for the present invention is not particularly limited, and it is possible to use various acids, such as phosphoric acid and phosphorous acid, and salts thereof. Although the phosphate may be contained in any form of primary phosphate, secondary phosphate, and tertiary phosphate, primary phosphate is preferred. Although the cationic species is also not particularly limited, alkali metal salt is preferred. Among them, sodium dihydrogen phosphate and potassium dihydrogen phosphate are preferred. It is preferred that the phosphoric acid compound content in the barrier polymer composition (A) is from about 5 to about 200 ppm in terms of phosphate radicals. The coloration resistance during melt molding may be insufficient in a case that the phosphoric acid compound content is less than about 5 ppm. In contrast, the melt stability may be insufficient in a case that the phosphoric acid compound content is more than about 200 ppm, and it is more preferably not more than about 160 ppm.

The barrier polymer composition (A) may contain a boron compound. By making a barrier polymer composition (A) containing a boron compound in such a manner, it is possible to suppress torque variation during melting by heating. The boron compound used for the present invention is not particularly limited and may include boric acids, borates, salts of boric acids, boron hydrides, and the like. Specifically, the boric acids may include orthoboric acid, metaboric acid, tetraboric acid, and the like; the borates may include triethyl borate, trimethyl borate, and the like; the salts of boric acids may include alkali metal salts, alkaline earth metal salts of various boric acids mentioned above, borax, and the like. Among these compounds, orthoboric acid (hereinafter, may be described simply as boric acid) is preferred. It is preferred that the boron compound content is preferably from about 20 to not more than about 2000 ppm in terms of boron element. The suppression of torque variation during melting by heating may become insufficient in a case that the boron compound content is less than about 20 ppm, and it is more preferably not less than about 50 ppm. In contrast, in a case that the boron compound content is more than about 2000 ppm, gelation easily occurs and the moldability may deteriorate, and it is more preferably not more than about 1000 ppm.

Among all, the barrier polymer composition (A) may contain thermoplastic resins other than the modified EVOH resin (a) as long as not inhibiting the effects of the present invention. The thermoplastic resin other than the modified EVOH resin (a) used for the barrier layer may include polyethylenes, such as linear low density polyethylene, low density polyethylene, very low density polyethylene, medium density polyethylene, and high density polyethylene; homo- or co-polymers of olefin, such as ethylene-vinyl acetate copolymers, ionomers, ethylene-propylene (block or random) copolymers, ethylene-(meth) acrylic acid copolymers, ethylene-(meth)acrylic ester copolymers, polypropylene, propylene-α-olefin copolymers, polybutene, and polypentene, or polyolefins, such as those graft modified with unsaturated carboxylic acid or esters thereof; polyester; polyamide (including copolyamide); polyvinyl chloride; polyvinylidene chloride; acrylic resins; polystyrene; polyvinyl ester; polyester elastomers; polyurethane elastomers; chlorinated polystyrene; chlorinated polypropylene; aromatic polyketone or aliphatic polyketone, and polyalcohol obtained by reducing them; polyacetal; polycarbonate; and the like.

In addition, as long as not inhibiting the effects of the present invention, in order to improve melt stability and the like, barrier polymer composition (A) may contain from about 0.001 to about 1 wt % of one or more kinds of hydrotalcite compound, hindered phenol-based and hindered amine-based heat stabilizers, metal salt of higher fatty carboxylic acid (for example, calcium stearate, magnesium stearate, and the like). Specific examples of such other components may include the following.

Antioxidant: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl)propionate, 4,4'-thiobis-(6-t-butylphenol), and the like.

Ultraviolet absorber: ethylene-2-cyano-3,3'-diphenyl acrylate, 2-(2'-hydroxy-5'-methylphenyl)benzotriazole, 2-(2'-hydroxy-3'-t-butyl-5'-methylphenyl) 5-chlorobenzotriazole, 2-hydroxy-4-methoxybenzophenone, 2,2'-dihydroxy-4-methoxybenzophenone, and the like.

Plasticizer: dimethyl phthalate, diethyl phthalate, dioctyl phthalate, wax, liquid paraffin, phosphates, and the like.

Antistatic agent: pentaerythritol monostearate, sorbitan monopalmitate, sulfated polyolenns, polyethylene oxide, Carbowax, and the like.

Lubricant: ethylene bisstearoamide, butyl stearate, and the like.

Colorant: carbon black, phthalocyanine, quinacridon, indoline, azo pigments, red oxide, and the like.

Filler: glass fiber, vallastonite, calcium silicate, and the like.

Before making the barrier polymer composition (A), components in the barrier polymer composition (A) may be pre-mixed. A method of pre-mixing is not particularly limited but it may be dry-mixed (mixing below melt temperature) and melt-mixed (mixing above melt temperature). The components may be pulverized in advance for better mixing efficiency.

Methods of Preparing Modified EVOH Resin (a)

A method of preparing the modified EVOH resin (a) is not particularly limited, and may include well-known preparing methods. For example, it may include a method, comprising: obtaining a modified ethylene-vinyl ester copolymer represented by a following formula (VII) by radical polymerization of ethylene, vinyl ester represented by a following formula (V), and an unsaturated monomer represented by a following formula (VI), and then saponifying it.

In the formula (V), $R^9$ denotes a hydrogen atom or an alkyl group having a carbon number of from 1 to 9, or from 1 to 4. Vinyl esters represented by the formula (V) may be

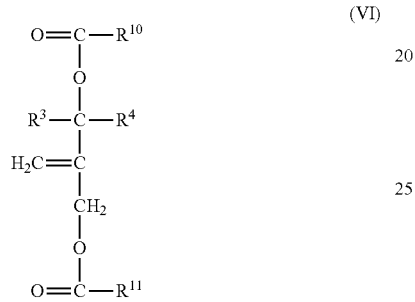

exemplified by vinyl formate, vinyl acetate, vinyl propionate, vinyl butyrate, vinyl isobutyrate, vinyl pivalate, vinyl versatate, vinyl caproate, and the like. In an economic perspective, vinyl acetate is particularly preferred. Examples of the vinyl ester monomer may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Particularly, vinyl acetate is preferable.

In the formula (VI), $R^3$ and $R^4$ are same as those in the formula (II). Each of $R^{10}$ and $R^{11}$ independently denotes a hydrogen atom or an alkyl group having a carbon number of from 1 to 9. A carbon number of the alkyl group is preferably from 1 to 4. The unsaturated monomer represented by the formula (VI) may include 2-methylene-1,3-propanediol diacetate (MPDAc), 2-methylene-1,3-propanediol dipropionate, 2-methylene-,3-propanediol dibutyrate, and the like. Among all, 2-methylene-1,3-propanediol diacetate is preferably used in view of easy production. In a case of 2-methylene-1,3-propanediol diacetate, $R^3$ and $R^4$ are hydrogen atoms and $R^{10}$ and $R^{11}$ are methyl groups.

In the formula (VII), $R^3$, $R^4$, $R^9$, $R^{10}$ and $R^{11}$, are same as the formula (I) through (VI). "a", "b" and "c" respectively represent the content (mol %) of ethylene unit, vinyl unit, and modifying group unit based on the total monomer units. The modified ethylene-vinyl ester copolymer thus obtained is a new polymer and is subjected to saponification treatment after that.

In addition, instead of the unsaturated monomer represented by the above formula (VI), an unsaturated monomer represented by the following formula (VIII) may also be copolymerized, and in this case, only the units derived from the unsaturated monomer represented by the above formula (V) are saponified.

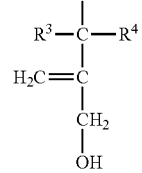

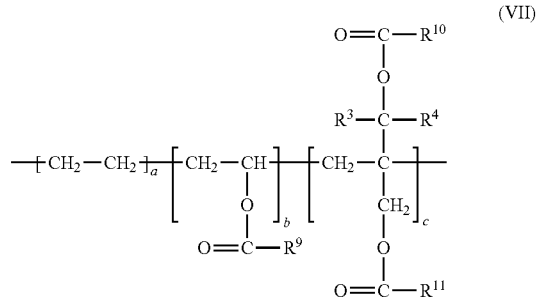

In the formula (VIII), $R^3$ and $R^4$ are same as those in the formula (II). The unsaturated monomer represented by the formula (VIII) may include 2-methylene-1, 3-propanediol.

The unsaturated monomers represented by the formula (VI) and the formula (VIII) used in the present invention have high copolymerization reactivity with vinyl ester monomers, so that copolymerization reaction proceeds easily. Accordingly, it is easy to increase an amount of modification and a degree of polymerization of the modified ethylene-vinyl ester copolymer thus obtained. In addition, an amount of the unreacted unsaturated monomers remaining after polymerization is less even when the polymerization reaction is stopped at a low conversion, so that it is excellent in respect of environment and cost. The unsaturated monomers represented by the formula (VI) and the formula (VIII) are preferred over other monomers such as allyl glycidyl ether and 3,4-diacetoxy-1-butene, having a functional group in an allylic position and having only one carbon atom. Here, the unsaturated monomer represented by the formula (VI) has higher reactivity than the unsaturated monomer represented by the formula (VIII).

Another method of preparing the modified EVOH which contains the structure represented by formula (III) may comprise: copolymerizing of ethylene, vinyl ester represented by formula (V), and an unsaturated monomer represented by a following formula (IX); and then saponifying it.

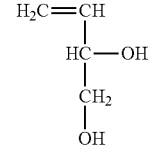

Following methods can also be used: the method of saponifying a copolymer obtained by copolymerizing 3,4-diacyloxy-1-butene, a vinyl ester monomer and ethylene; the method of saponifying a copolymer obtained by copolymerizing 3-acyloxy-4-ol-1-butene, a vinyl ester monomer and ethylene; the method of saponifying a copolymer obtained by copolymerizing 4-acyloxy-3-ol-1-butene, a vinyl ester monomer and ethylene; and the method of saponifying a copolymer obtained by copolymerizing 3,4-diacyloxy-2- methyl-1-butene, a vinyl ester monomer and ethylene. As an example of the process for preparing EVOH having alkylene as a binding chain, there is the method of saponifying a copolymer obtained by copolymerizing 4,5-diol-1-pentene, 4,5-diacyloxy-1-pentene, 4,5-diol-3-methyl-1-pentene, 5,6-diol-1-hexene or 5,6-diacyloxy-1-hexene, a vinyl ester monomer and ethylene. The method of saponifying a copolymer obtained by copolymerizing 3,4-diacyloxy-1-butene, a vinyl ester monomer and ethylene is preferable from the viewpoint that copolymerization reactivity is excellent and as 3,4-diacyloxy-1-butene, 3,4-diacetoxy-1-butene is more preferably used. Also, a mixture of these monomers can be used. Furthermore, a small amount of 3,4-diacetoxy-1-butane, 1,4-diacetoxy-1-butene and 1,4-diacetoxy-1-butane can be contained as a small amount of impurities.

A method of copolymerizing ethylene and vinyl ester monomer may include well-known methods such as solution polymerization, bulk polymerization, suspension polymerization, and emulsion polymerization. As a polymerization initiator, an azo-based initiator, peroxide-based initiator, redox-based initiator, and the like may be properly selected according to a polymerization method. The copolymerization may be performed under presence of thiol compounds such as thioacetic acid and mercaptopropionic acid, or other chain-transfer agents.

As a saponification reaction, alcoholysis, hydrolysis, and the like, which uses a well-known alkali catalyst or acidic catalyst as a saponification catalyst in an organic solvent, may be adopted. In particular, a saponification reaction using a caustic soda catalyst with methanol as a solvent is simple and easy, and thus most preferable.

It is possible to obtain the modified EVOH of the present invention by saponifying the modified ethylene-vinyl ester copolymer thus obtained. At this time, the vinyl ester units in the copolymer are converted to vinyl alcohol units. In addition, ester bonds derived from the unsaturated monomer are also hydrolyzed at the same time to be converted to a 1,3-diol structure. In such a manner, it is possible to hydrolyze different kinds of ester group by one saponification reaction at the same time.

It is possible to employ a known method for a method of saponifying the modified ethylene-vinyl ester copolymer. The saponification reaction is usually carried out in an alcohol or hydrous alcohol solution. The alcohol preferably used is a lower alcohol, such as methanol and ethanol, and particularly preferably methanol. Alcohol or hydrous alcohol used for the saponification reaction may contain another solvent, as long as the solvent is not more than about 40 wt % of its weight, such as acetone, methyl acetate, ethyl acetate, and benzene. The catalyst used for the saponification is, for example, alkali metal hydroxides, such as potassium hydroxide and sodium hydroxide; alkali catalysts, such as sodium methylate; and acid catalysts, such as mineral acid. Although the temperature to carry out the saponification is not limited, it is preferably in a range of from about 200° C. to about 1200° C. In a case that gelatinous products precipitate as the saponification proceeds, it is possible to obtain modified EVOH by grinding the products and then washing and drying them.

The modified ethylene-vinyl alcohol copolymer used in the present invention may contain a structural unit derived from another ethylenic unsaturated monomer that is copolymerizable with ethylene, vinyl ester, and the unsaturated monomer as long as not inhibiting the effects of the present invention. Such ethylenic unsaturated monomer may include, for example, α-olefins, such as propylene, n-butene, isobutylene, and 1-hexene; acrylic acid and salts thereof, unsaturated monomers containing an acrylic ester group; methacrylic acid and salts thereof; unsaturated monomers containing a methacrylic ester group; acrylamide, N-methylacrylamide, N-ethylacrylamide, N,N-dimethylacrylamide, diacetoneacrylamide, acrylamide propane sulfonic acid and salts thereof, and acrylamidopropyl dimethylamine and salts thereof (for example, quaternary salts); methacrylamide, N-methylmethacrylamide, N-ethylmethacrylamide, methacrylamide propane sulfonic acid and salts thereof, and methacrylamidopropyl dimethylamine and salts thereof (for example, quaternary salts); vinyl ethers, such as methyl vinyl ether, ethyl vinyl ether, n-propyl vinyl ether, i-propyl vinyl ether, n-butyl vinyl ether, 1-butyl vinyl ether, t-butyl vinyl ether, dodecyl vinyl ether, stearyl vinyl ether, and 2,3-diacetoxy-1-vinyloxypropane; vinyl cyanides, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate, 2,3-diacetoxy-1-allyloxypropane, and allyl chloride; unsaturated dicarboxylic acids, such as maleic acid, itaconic acid, and fumaric acid, and salts thereof or esters thereof; vinylsilane compounds, such as vinyltrimethoxysilane; and isopropenyl acetates.

Also, for preparing the modified EVOH resin (a) which contains the structure represented by formula (IV), the method may comprise: reacting an ethylene vinyl alcohol copolymer (c) with a monofunctional epoxy compound (d) having a molecular weight of not more than 500. The ethylene content of the EVOH (c) for use in the present invention is preferably from about 5 to about 55 mol %.

The method for producing the modified EVOH resin (a) by reacting the EVOH (c) with the monofunctional epoxy compound (d) having a molecular weight of not more than 500 is not limited particularly; examples of preferable methods include a production method in which the EVOH (c) and the monofunctional epoxy compound (d) are reacted together in a solution, and a production method in which the EVOH (c) and the monofunctional epoxy compound (d) are reacted together within an extruder.

In the production method using a solution reaction, the modified EVOH resin (a) is obtained by reacting the monofunctional epoxy compound (d) with a solution of the EVOH (c) in the presence of an acid catalyst or an alkali catalyst. In addition, the modified EVOH resin (a) can be produced also by dissolving the EVOH (c) and the monofunctional epoxy compound (d) in a reaction solvent and then performing a heat treatment. As the reaction solvent, preferable are polar aprotic solvents, which are good solvents of the EVOH (c), such as dimethylsulfoxide, dimethylformamide, dimethylacetamide and N-methylpyrrolidone.

The reaction catalyst includes acid catalysts such as p-toluenesulfonic acid, methanesulfonic acid, trifluoromethane sulfonic acid, sulfuric acid and boron trifluoride and alkali catalysts such as sodiumhydroxide, potassiumhydroxide, lithium hydroxide and sodium methoxide. Among these, acid catalysts are preferably employed. The amount of the catalyst is appropriately from about 0.0001 to about 10 parts by weight to 100 parts by weight of the EVOH (c). The reaction temperature is appropriately within the range of room temperature to about 150° C.

In the production method in which the EVOH (c) and the monofunctional epoxy compound (d) are reacted together within an extruder, there are no particular limitations for extruder to use, but it is preferable to react the EVOH (c) and the monofunctional epoxy compound (d) at a temperature of from about 180° C. to about 300° C. by use of a single screw extruder, twin screw extruder or a multi-screw extruder having two or more screws. As described below, during the reaction performed within an extruder, it is preferable to employ a relatively low melting temperature in the case of causing a catalyst (e) to be present. On the other hand, when no catalyst (e) is employed, a desirable temperature is from about 200° C. to about 300° C.

When a twin screw extruder or a multi-screw extruder having two or more screws is used, modification of the screw structure easily increases the pressure within the reaction section and makes it possible to perform a reaction between the EVOH (c) and the monofunctional epoxy compound (d) efficiently. In the case of using a single screw extruder, it is possible to increase the pressure within the reaction section by connecting two or more extruders and disposing a valve in a resin passageway between the extruders. Alternatively, the production may be carried out by connecting two or more twin screw extruders or multi-screw extruders having two or more screws.

The degree of saponification of the vinyl ester moiety in the EVOH (c) for use in the present invention is preferably not less than about 90%, or not less than about 95%, or not less than about 98%, or not less than about 99%.

The epoxy compound having a molecular weight of not more than 500 for use in the present invention must be a monofunctional epoxy compound (d). In other words, it must be an epoxy compound which has only one epoxy group in its molecule. When a polyfunctional epoxy compound of two or more functionalities is used, the effect of the present invention cannot be obtained. It is to be noted that during the production of the monofunctional epoxy compound (d), a very small amount of polyfunctional epoxy compound may be contained. Unless the effect of the present invention is affected, a monofunctional epoxy compound (d) containing a very small amount of polyfunctional epoxy compound can be used as the monofunctional epoxy compound (d) having a molecular weight of not more than 500 in the present invention.

The monofunctional epoxy compound (d) having a molecular weight of not more than 500 for use in the present invention is not limited particularly. Specifically, compounds represented by the following formula (X) through (XIV) can be used suitably:

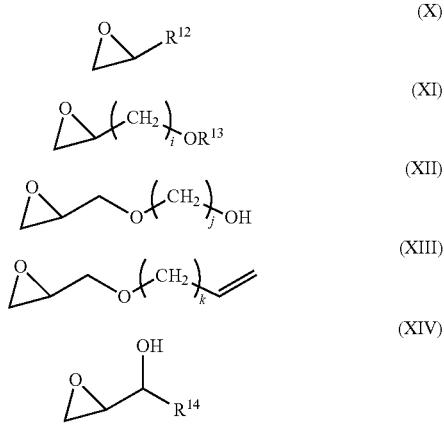

wherein $R^{12}$, $R^{13}$ and $R^{14}$ each represent a hydrogen atom, an aliphatic hydrocarbon group (e.g., alkyl group, alkenyl group or the like) having 1-10 carbon atoms, an alicyclic hydrocarbon group (e.g., cycloalkyl group, cycloalkenyl group or the like) having 3-10 carbon atoms, and an aromatic hydrocarbon group having 6-10 carbon atoms (e.g., phenyl group or the like); and i, j, k, l and m each denote an integer of 1-8.

Epoxy compounds having 2-8 carbon atoms are particularly preferred as the monofunctional epoxy compound (d) having a molecular weight of not more than 500 used for the present invention. The number of carbon atoms of the monofunctional epoxy compound (d) is preferably 2-6, more preferably 2-4 from the viewpoints of easiness of the handling of a compound and reactivity with EVOH (c). Moreover, it is preferable that the monofunctional epoxy compound (d) be a compound represented by the formula (X) or (XI). From the viewpoints of the reactivity with EVOH (c) and the gas barrier properties of a modified EVOH (a) to be obtained, 1,2-epoxybutane, 2,3-epoxybutane, epoxypropane, epoxyethane and glycidol are particularly preferable. Above all, epoxypropane and glycidol are preferable. In the applications in which sanitariness is required, such as food packaging, drink packaging and drug packaging, it is desirable to use 1,2-epoxybutane, 2,3-epoxybutane, epoxypropane and epoxyethane as the monofunctional epoxy compound (d). Above all, epoxypropane is preferably employed.

A modified EVOH resin (a) is obtained by reacting the EVOH (c) and monofunctional epoxy compound (d). A preferable mixing ratio of the EVOH (c) and the monofunctional epoxy compound (d) is from about 1, or from about 2, or from about 5, to about 50, or to about 40, or to about 35, parts by weight of (d) to 100 parts by weight of (c).

Thermally Cured Polymer Composition (B)

Another layer of the multilayer article in accordance with the present invention is formed from thermally cured polymer composition (B) containing a thermally cured polymer (b). The thermally cured polymer (b) is a polymer which becomes irreversibly cured. Curing is caused by heat or suitable radiation and may be promoted by high pressure or the use of a catalyst. It results in extensive cross-linking between polymer chains to give a polymer network.

The thermally cured polymer (b) may be a thermosetting polymer such as, for example, an unsaturated polyester resin, a polyurethane resin, a polyurea/polyurethane resin, a vulcanized rubber, a phenolic resin, a urea-formaldehyde resin, a melamine resin, an epoxy resin, a polyimide resin, a cyanate ester resin, a silicone resin and the like.

The thermally cured polymer (b) may be a combination of a thermoplastic resin and crosslinking agent (catalyst) which is thermally initiated.

The thermoplastic resin may include polyethylenes, such as linear low density polyethylene, low density polyethylene, very low density polyethylene, medium density polyethylene, and high density polyethylene; chlorinated polyethylene; homo- or co-polymers of olefins, such as ethylene-vinyl acetate copolymers, ethylene-propylene (block or random) copolymers, or polyolefins, such as those graft modified with unsaturated carboxylic acid or esters thereof; and the like. Polyethylene is preferably used because of economics and its properties after curing.

Crosslinking agents may include an organic peroxide initiator. For rotomolding, the peroxide, which can be used as cross-linking agent and may also be used as radical initiator for grafting, may be selected from, but not limited to, 2-t-butylperoxy-2-methylpropane; 2,5-dimethyl-2,5-bis(tert-butylperoxy)hexane; 2,5-dimethyl-2,5-di(tert-butylperoxy)hexyne-3; di-cumyl peroxide; di-tertiary-butyl peroxide; and α,α'-di(t-butyl-peroxy)-1,3- and 1,4-di-isopropylbenzene t-butyl ca-cumyl peroxide.

The amount of the initiator will usually be in the range of from about 0.1, or from about 0.3, to about 2, or to about 1, parts by weight of the ethylene polymer.

In certain embodiments, crosslinking agents may include crosslinking co-agents.

Other Components in Thermally Cured Polymer Composition (B)

As long as not inhibiting the effects of the present invention, it is possible to make the thermally cured polymer composition (B) by blending another component in the thermally cured polymer (b). For example, it is also possible to make the thermally cured polymer composition (B) that has thermoplastic resins other than the thermally cured polymer (b), plasticizers, lubricants, stabilizers, surfactants, colorants, ultraviolet absorbers, antistatic agents, desiccants, crosslinkers, metal salts, fillers, reinforcing agents such as various fibers, and the like blended therein.

In order to improve melt stability and the like, it is allowed to contain from about 0.001 to about 1 wt % of one or more kinds of hydrotalcite compound, hindered phenol-based and hindered amine-based heat stabilizers, metal salt of higher fatty carboxylic acid (for example, calcium stearate, magnesium stearate, and the like) in the resin composition. Specific examples of other components may include the following.

Antioxidant: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl)propionate, 4,4'-thiobis-(6-t-butylphenol), and the like.

Ultraviolet absorber: ethylene-2-cyano-3,3'-diphenyl acrylate, 2-(2'-hydroxy-5'-methylphenyl)benzotriazole, 2-(2'-hydroxy-3'-t-butyl-5'-methylphenyl) 5-chlorobenzotriazole, 2-hydroxy-4-methoxybenzophenone, 2,2'-dihydroxy-4-methoxybenzophenone, and the like.

Plasticizer: dimethyl phthalate, diethyl phthalate, dioctyl phthalate, wax, liquid paraffin, phosphates, and the like.

Antistatic agent: pentaerythritol monostearate, sorbitan monopalmitate, sulfated polyolenns, polyethylene oxide, Carbowax, and the like.

Lubricant: ethylene bisstearoamide, butyl stearate, and the like.

Colorant: carbon black, phthalocyanine, quinacridon, indoline, azo pigments, red oxide, and the like.

Filler: glass fiber, vallastonite, calcium silicate, and the like.

Before making the thermally cured polymer composition (B), the components may be pre-mixed. A method of pre-mixing is not particularly limited but it may be dry-mixed (mixing below melt temperature) and melt-mixed (mixing above melt temperature). The components may be pulverized in advance for better mixing efficiency.

Multilayer Article

In the multilayer articles of the present invention, one or more layers other than the barrier layer and the thermally cured polymer layer may optionally be included depending on requirements of the end use. Such other layers may comprise thermoplastic resins, plasticizers, lubricants, stabilizers, surfactants, colorants, ultraviolet absorbers, antistatic agents, desiccants, crosslinkers, metal salts, fillers, reinforcing agents such as various fibers, and the like blended therein.

The thermoplastic resin used for the other layer may include polyethylenes, such as linear low density polyethylene, low density polyethylene, very low density polyethylene, medium density polyethylene, and high density polyethylene; homo- or co-polymers of olefin, such as ethylene-vinyl acetate copolymers, ionomers, ethylene-propylene (block or random) copolymers, ethylene-(meth) acrylic acid copolymers, ethylene-(meth)acrylic ester co-polymers, polypropylene, propylene-α-olefin copolymers, polybutene, and polypentene, or polyolefins, such as those graft modified with unsaturated carboxylic acid or esters thereof; polyester; polyamide (including copolyamide); polyvinyl chloride; polyvinylidene chloride; acrylic resins; polystyrene; polyvinyl ester; polyester elastomers; polyurethane elastomers; chlorinated polystyrene; chlorinated polypropylene; aromatic polyketone or aliphatic polyketone, and polyalcohol obtained by reducing them; polyacetal; polycarbonate; and the like.

An adhesive layer for adhering EVOH-containing layers to other layers may be included in the other layer. Preferred resins for use as the adhesive resin include polyolefins modified with unsaturated carboxylic acid or a derivative thereof. Typical examples of suitable adhesive resins include carboxyl group-containing modified polyolefin resins obtained by chemically binding an unsaturated carboxylic acid or an anhydride thereof to a polyolefin resin. Specific examples of the adhesive resin include polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer. In terms of mechanical strength and molding processability, polyethylenes modified with maleic anhydride and polypropylenes modified with maleic anhydride are preferable, and polyethylenes modified with maleic anhydride are particularly preferable among these.

Before making the other layer(s), components in the other layer(s) may be pre-mixed. A method of pre-mixing is not particularly limited but it may be dry-mixed (mixing below melt temperature) and melt-mixed (mixing above melt temperature). The components may be pulverized in advance for better mixing efficiency.

The layer structure of the multilayer article of the present invention is not particularly limited. When the multilayer structure described below is used for a multilayer article, the leftmost layer is the innermost layer, and the rightmost layer is the outermost layer.

Three layers: B/A/B, B/A/O, O/A/B

Four layers: B/A/O/B, B/O/A/B, B/A/B/O, O/B/A/B, O/A/O/B

Five layers: B/O/A/O/B, B/A/B/A/B, O/B/A/B/O

In the above, "A" represents the barrier layer, "B" represents the thermally cured polymer layer, and "O" represents the other layer.

In case the barrier layer directly contacts with the thermally cured polymer layer, either the barrier layer or the thermally cured polymer layer may have adhesion property toward another layer. In order to employ such adhesion property, the above mentioned resins preferably used for the adhesive layer may be added in the barrier layer, the thermally cured polymer layer or both.

Although a thickness of the entire multilayer article is not particularly limited, it is usually from about 15 µm to about 20 mm thick depending on requirement as multilayer article. A thickness of the barrier layer is also not particularly limited, and is usually from about 1 µm to about 2 mm thick depending on requirement as multilayer article. Further, a thickness of the thermally cured polymer layer is not particularly limited, and is usually from about 5 µm to about 15 mm thick depending on requirement as multilayer article.

Rotational Molding

A multilayer article comprising the barrier layer and the thermally cured polymer layer formed by rotational molding is a preferred embodiment. Although blow molding, thermoforming, and injection molding may be used for the manufacture of hollow plastic products, rotational molding has particular advantages in terms of relatively low levels of residual stresses and inexpensive molds. Rotational molding is best known for the manufacture of tanks but it can also be used to make complex medical products, toys, leisure craft, and highly aesthetic point-of-sale products. Basically the process of rotational molding consists of introducing a known amount of plastic in powder, granular, or viscous liquid form into a hollow, shell-like mold. The mold is rotated and/or rocked about two principal axes at relatively low speeds as it is heated so that the plastic enclosed in the mold adheres to, and forms a monolithic layer against, the mold surface. The mold rotation continues during the cooling phase so that the plastic retains its desired shape as it solidifies. When the plastic is sufficiently rigid, the cooling and mold rotation is stopped to allow the removal of the plastic product from the mold. At this stage, the cyclic process may be repeated.

The sequence of rotational molding for making multilayer article is not limited but, as an example, can be described as follows. The component of the thermally cured polymer layer is placed in a mold and rotated around multiple axes while being simultaneously heated, causing the thermally cured polymer composition (B) of the thermally cured polymer layer to sinter and melt, coating the inside of the mold with the component, which forms the thermally cured polymer layer. Then the barrier layer polymer composition (A) of the barrier layer is introduced into the mold and heated until it melts, and again the mold is rotated around multiple axes. Then an additional charge of the thermally cured polymer composition (B) of the thermally cured polymer layer is added to the mold. Once again, the mold is heated and rotated, then allowed to cool. In this example, the multilayer article formed by rotational molding process will have three layers, a barrier layer encompassed by two thermally cured polymer layers.

In the case of the above sequence, the first thermally cured polymer layer will have heat exposure three times, two times for making two thermally cured polymer layers and one time for making one barrier layer. As previously described, over-curing of thermally cured polymer layer from high curing temperature and/or long curing time may cause such thermally cured polymer layer to lose its mechanical properties due to degradation. The melt temperature (Tm) of the barrier polymer composition (A) is important to the properties of the first thermally cured polymer layer, and it is desirable if the Tm of the two layers is closer.

Melt viscosity and powder particle property of the polymers used for rotational molding are other important characteristics to form consistent layer distribution in heating process. In general, lower melt viscosity yields shorter oven cycle because of better polymer flow but it may lose mechanical properties because of shorter polymer chain. Because major role of the barrier layer is not mechanical but barrier properties, higher melt viscosity is preferred to shorten cycle time. It is preferred melt flow rate (MFR) (190° C., 2160 g load) of the barrier polymer composition (A) is more than about 4.2 g/10 minutes. The principal form of the vast majority of polymers used in rotational molding is as ~35 mesh powder.

Fuel Container

The fuel container formed by rotational molding process is a preferred embodiment. Co-extrusion blow-mold or thermoforming is another method of forming fuel container in the market. For multilayer barrier fuel container applications, rotational molding has particular advantages in terms of seamless barrier layer distribution to minimize fuel permeation and relatively easier employment of thermally cured polymer to enhance mechanical properties. These advantages are gaining more importance because of increasing environmental concern for fuel diffusion from fuel tank and safety concern for breaking of the fuel container in case of accident.

EXAMPLES

The present invention is more specifically described by way of examples. The scope of the present invention, however, is not limited to these examples. It is to be noted that production methods as well as methods of measurement, calculation and evaluation in Examples and Comparative Examples are each as described below.

Materials

Modified EVOH 1: Ethylene content 38 mol %, degree of modification 2.5 mol %, degree of saponification >99.9 mol %, melting point 152° C., MFR 3.9 g/10 min (190° C., 2160 g).

Modified EVOH 2: Ethylene content 38 mol %, degree of modification 1.5 mol %, degree of saponification >99.9 mol %, melting point 160° C., MFR 6.5 g/10 min (190° C., 2160 g).

Modified EVOH 3: ethylene content 38 mol %, degree of modification 1.5 mol %, degree of saponification >99.9 mol %, melting point 160° C., MFR 2.0 g/10 min (190° C., 2160 g).

Modified EVOH 4: Ethylene content 44 mol %, degree of modification 1.0 mol %, degree of saponification >99.9 mol %, melting point 154° C., MFR 2.0 g/10 min (190° C., 2160 g).

Modified EVOH 5: Ethylene content 38 mol %, degree of modification 2.3 mol %, degree of saponification >99.9 mol %, melting point 153° C., MFR 1.5 g/10 min (190° C., 2160 g).

Comparative EVOH 1: EVAL™ H171B, Ethylene-Vinyl Alcohol copolymer commercially available from Kuraray Co., Ltd. (ethylene content 38 mol %, degree of saponification >99.9 mol %, melting point 172° C., MFR 1.7 g/10 minutes (190° C., 2160 g)).

Comparative EVOH 2: EVAL™ E105B, Ethylene-Vinyl Alcohol copolymer commercially available from Kuraray Co., Ltd. (ethylene content 44 mol %, degree of saponification >99.9 mol %, melting point 165° C., MFR 5.5 g/10 minutes (190° C., 2160 g)).

Comparative EVOH 3: EVAL™ G176B, Ethylene-Vinyl Alcohol copolymer commercially available from Kuraray Co., Ltd. (ethylene content 48 mol %, degree of saponification >99.9 mol %, melting point 157° C., MFR 6.5 g/10 minutes (190° C., 2160 g)).

SYNTHETIC EXAMPLES

Modified EVOH 1
(1) Synthesis of Modified EVAc

To a 250 L pressure reaction vessel provided with a jacket, a stirrer, a nitrogen inlet, an ethylene inlet, and an initiator addition port, 100 kg of vinyl acetate (hereinafter, referred to as VAc), 5.7 kg of methanol (hereinafter, may be referred to as MeOH), and 3.0 kg of 2-methylene-1,3-propanediol diacetate (hereinafter, referred to as MPDAc) were charged, and the temperature was raised to 60° C., and after that, nitrogen bubbling was carried out for 30 minutes to purge inside the reaction vessel with nitrogen. Subsequently, ethylene was introduced to have a reaction vessel pressure (ethylene pressure) of 5.1 MPa. The temperature in the reaction vessel was adjusted to 60° C., then 50.0 g of 2,2'-azobis (2,4-dimethylvaleronitrile) ("V-65" produced by Wako Pure Chemical Industries, Ltd.) as an initiator was added in the form of methanol solution to initiate polymerization. During the polymerization, the ethylene pressure was maintained at 5.1 MPa and the polymerization temperature was maintained at 60° C. And, MPDAc methanol solution with concentration of 30 wt % was continuously added into polymerization solution at 350 mL/15 minutes. After 6.5 hours, when the conversion of VAc became 41%, MPDAc feed was stopped and the vessel was cooled to room temperature. Then, 200 g of sorbic acid was added in the form of methanol solution to stop polymerization completely. After removing ethylene by opening the reaction vessel, a nitrogen gas was bubbled to completely remove ethylene. Subsequently, after unreacted VAc was removed under reduced pressure, MeOH was added to the modified ethylene-vinyl acetate copolymer (herein, may be referred to as modified EVAc) to which a structural unit derived from MPDAc was introduced by copolymerization to have a 20 mass % MeOH solution.

(2) Saponification of Modified EVAc

To a 500 L reaction vessel provided with a jacket, a stirrer, a nitrogen inlet, a reflux condenser, and a solution addition port, the 20 mass % MeOH solution of the modified EVAc obtained in (1) was charged. The temperature was raised to 60° C., while blowing nitrogen into the solution, and 0.5 equivalent of sodium hydroxide (based on vinyl acetate unit in the modified EVAc) was added as a MeOH solution having a sodium hydroxide concentration of 2 N. After completion of adding the MeOH sodium hydroxide solution, saponification reaction proceeded by stirring for two hours while keeping the temperature in the system at 60° C. After that, acetic acid was added to stop the saponification reaction. After that, while heating and stirring at 60-80° C., an ion exchange water was added to drain MeOH outside the reaction vessel and to precipitate modified EVOH. The precipitated modified EVOH was collected by decantation and ground with a mixer. The modified EVOH powder thus obtained was added in a 1 g/L aqueous acetic acid solution (bath ratio of 20:proportion of 1 kg of the powder to 20 L of the aqueous solution) and it was stirred and washed for two hours. It was drained and was further washed in a 1 g/L aqueous acetic acid solution (bath ratio of 20) and with stirring for two hours. It was again drained and washed in ion exchange water (bath ratio of 20) with stirring for two hours, which was repeated three times to carry out refinement. Subsequently, it was stirred and immersed in 10 L of an aqueous solution containing 0.5 g/L of acetic acid and 0.1 g/L of sodium acetate for four hours and then deliquored, and then dried at 60° C. for 16 hours to obtain roughly dried modified EVOH 1.

(3) Production of Modified EVOH Hydrous Pellet

To a 80 L stirring vessel provided with a jacket, a stirrer, and a reflux condenser, the roughly dried modified EVOH 1, water, and MeOH were charged and the temperature was raised to 80° C. for dissolution. The solution was extruded in a liquid mixture of water/MeOH:90/10, cooled to 5° C. through a glass tube having a diameter of 4 mm to be precipitated in the form of strand, and the strand was cut with a strand cutter into pellets to obtain modified EVOH 1 hydrous pellets. The moisture content of the modified EVOH 1 hydrous pellets thus obtained was measured by a halogen moisture meter "HR 73" manufactured by Mettler, and it was 60 mass % as wet basis.

(4) Production of Modified EVOH Composition Pellet

In a 1 g/L aqueous acetic acid solution (bath ratio of 20), the modified EVOH 1 hydrous pellets obtained in (3) above were added and stirred and washed for two hours. It was drained and was further added to a 1 g/L aqueous acetic acid solution (bath ratio of 20), and it was stirred and washed for two hours. After deliquoring, the aqueous acetic acid solution was renewed and same operation was carried out. After washing with the aqueous acetic acid solution and then draining it, it was washed in ion exchange water (bath ratio of 20) with stirring for two hours, then deliquored and repeated three times to carry out purification. Modified EVOH 1 hydrous pellets were thus obtained from which the catalyst residue during the saponification reaction was removed. The hydrous pellets were added to an aqueous solution (bath ratio of 20) having a concentration of sodium acetate of 0.5 g/L, an acetic acid concentration of 0.8 g/L, a phosphoric acid concentration of 0.005 g/L, and a boric acid concentration of 0.14 g/L immersed for four hours while periodically stirred. They were drained and dried at 80° C. for three hours and at 105° C. for 16 hours, thereby obtaining modified EVOH 1 composition pellets containing acetic acid, sodium salt, a phosphate compound and a boric acid.

Modified EVOH 2

Modified EVOH 2 was synthesized with the ethylene content, MPDAc content and degree of saponification shown in Table 1. The synthesis procedure was the same as that of Modified EVOH 1, except that 12 kg of MeOH and 1.8 kg of MPDAc were charged. And, ethylene was introduced to have a reaction vessel pressure (ethylene pressure) of 5.0 MPa. 120.0 g of 2,2'-azobis (2,4-dimethylvaleronitrile) ("V-65" produced by Wako Pure Chemical Industries, Ltd.) as an initiator was added. MPDAc methanol solution with concentration of 16 wt % was continuously added into polymerization solution at 550 mL/15 minutes. MPDAc feed was stopped and the vessel was cooled to room temperature, after 5.0 hours when the conversion of VAc became 45%. Then, 480 g of sorbic acid was added in the form of methanol solution to stop polymerization completely. When modified EVOH composition pellet was produced, boric acid was not added to an aqueous solution to treat the hydrous pellet.

Modified EVOH 3

Modified EVOH 3 can be synthesized with the ethylene content, MPDAc content and degree of saponification shown in Table 1. The synthesis procedure can be the same as that of Modified EVOH 1, except that 8.0 kg of MeOH and 1.8 kg of MPDAc can be charged. And, ethylene can be introduced to have a reaction vessel pressure (ethylene pressure) of 5.1 MPa. 120.0 g of 2,2'-azobis (2,4-dimethylvaleronitrile) ("V-65" produced by Wako Pure Chemical Industries, Ltd.) as an initiator can be added. MPDAc methanol solution with concentration of 16 wt % can be continuously added into polymerization solution at 560 mL/15 minutes. MPDAc feed can be stopped and the vessel can be cooled to room temperature, after 5.0 hours when the conversion of VAc becomes 45%. Then, 480 g of sorbic acid can be added in the form of methanol solution to stop polymerization completely. When modified EVOH composition pellet is produced, a boric acid concentration of 0.34 g/L can be used for an aqueous solution to treat the hydrous pellet.

Modified EVOH 4

Modified EVOH 4 was synthesized with the ethylene content, MPDAc content and degree of saponification shown in Table 1. The synthesis procedure was the same as that of Modified EVOH 1, except that 90 kg of VAc, 9.0 kg of MeOH and 0.9 kg of MPDAc were charged. And, ethylene was introduced to have a reaction vessel pressure (ethylene pressure) of 6.1 MPa. 108.0 g of 2,2'-azobis (2,4-dimethylvaleronitrile) ("V-65" produced by Wako Pure Chemical Industries, Ltd.) as an initiator was added. MPDAc methanol solution with concentration of 16 wt % was continuously added into polymerization solution at 340 mL/15 minutes. MPDAc feed was stopped and the vessel was cooled to room temperature, after 5.5 hours when the conversion of VAc became 45%. Then, 432 g of sorbic acid was added in the form of methanol solution to stop polymerization completely. When modified EVOH composition pellet was produced, a boric acid concentration of 0.44 g/L was used for an aqueous solution to treat the hydrous pellet.

Modified EVOH 5

EVOH which had ethylene content 38.2 mol %, degree of saponification 99.7 mol %, MFR 4.9 g/10 min (190° C./2160 g) can be used to prepare modified EVOH 5. Modification can be done by employing TEM-35BS twin screw extruder (37 mmD, L/D=52.5) manufactured by Toshiba Machine Co., Ltd as described in U.S. Pat. No. 7,811,646B2.

Catalyst solution can be prepared by following method. Obtain a solution by mixing 28 parts by weight of zinc acetylacetonate monohydrate and 957 parts by weight of 1,2-dimethoxyethane. To the resulting mixed solution, 15 parts by weight of trifluoromethane sulfonic acid can be added under stirring, yielding a catalyst solution.

Barrel C1 can be cooled with water, and barrels C2-C15 can be set at 200° C. The extruder can be driven at a screw rotation speed of 250 rpm. The EVOH mentioned above can be fed from a resin feed opening of C1 at a rate of 11 kg/hr. Epoxypropane and the catalyst solution prepared by the method mentioned above can be fed through a compression inlet of C8 after mixing. The epoxypropane and the catalyst solution can be fed at rates of 1.5 kg/hr and 0.13 kg/hr, respectively. Subsequently, unreacted epoxypropane can be removed through vent 2 under atmospheric pressure and then an aqueous trisodium ethylenediaminetetraacetate trihydrate solution of a concentration of 8.2% by weight can be added as a catalyst deactivator through a compression inlet 2 of C13 at a rate of 0.11 kg/hr. The water can be removed through vent 3 under vacuum. Then, modified EVOH 5 can be obtained after cutting into pellet.

Analysis results of modified EVOH 5 actually used (but prepared by a different method) are summarized in Table 1.

Analysis for Modified EVOH

Content of Each Structural Unit in Modified EVAc 1-4

In the modified EVAc 1-4, the contents of ethylene units (a) (mol %), the contents of structural units derived from VAc (b) (mol %) and the content of structural units derived from MPDAc (c) (mol %) were calculated based on the spectrum obtained by $^1$H-NMR (nuclear magnetic resonance) measurement of the modified EVAc before saponification following the method described in U.S. Pat. No. 9,663,592B. 500 MHz $^1$H-NMR ("GX-500" manufactured by JEOL Ltd.) was used for measurement. Contents of ethylene units (a) (mol %) and the contents of structural units derived from MPDAc (mol %) in the modified EVAc 1-4 was same as ethylene contents (mol %) and content of the modified group (mol %) in the modified EVOH 1-4, respectively. The results are shown in Table 1.

Degree of Saponification in Modified EVAc 1-4

The degree of saponification of the modified EVOH were calculated based on the spectrum obtained by $^1$H-NMR (nuclear magnetic resonance) measurement following the method described in U.S. Pat. No. 9,663,592B. 500 MHz $^1$H-NMR ("GX-500" manufactured by JEOL Ltd.) was used for measurement. The results are shown in Table 1.

Content of the Modified Group in Modified EVOH 5

In the modified EVOH, content of the modified group (mol %) in the modified EVOH 5 was calculated based on the spectrum obtained by $^1$H-NMR (nuclear magnetic resonance) measurement following the method described in U.S. Pat. No. 7,811,646B2. 500 MHZ $^1$H-NMR ("GX-500" manufactured by JEOL Ltd.) was used for measurement. The results are shown in Table 1.

Ethylene Content and Degree of Saponification in Unmodified EVOH

The ethylene content (mol %) and the degree of saponification (mol %) of the EVOH for modified EVOH 5 and comparative EVOH 1-3 were calculated based on the spectrum obtained by $^1$H-NMR (nuclear magnetic resonance) measured using a dimethyl sulfoxide (DMSO)-$d_6$ as a solvent. 500 MHz $^1$H-NMR ("GX-500" manufactured by JEOL Ltd.) was used for measurement. The results are shown in Table 1.

Melting Point

Measurement of the modified EVOH composition pellets was performed according to JIS K7121 by raising the temperature from 30° C. to 215° C. at a rate of 10° C./min., and after that, rapidly cooling it to −35° C. at 100° C./min., and again raising the temperature from −35° C. to 195° C. at a rate of temperature rise of 10° C./min. (differential scanning calorimeter (DSC) "RDC220/SSC5200H" manufactured by Seiko Instruments & Electronics Ltd). The results are shown in Table 1.

Melt Flow Rate (MFR)

The melt flow rate (g/10 minutes) of the modified EVOH composition pellets was measured by a melt flow indexer (MP1200, Tinius Olsen TMC, Horsham, Pennsylvania USA) under conditions of a temperature at 190° C. and with a load of 2160 g. The results are shown in Table 1.

Preparation of Monolayer Film

Using the modified EVOH composition pellets, monolayer film formation was carried out using a 20 mm extruder "D2020" (D (mm):20, L/D:20, compression ratio:2.0, screw: full night) manufactured by Toyo Seiki Seisaku-Sho, Ltd. under the conditions below to obtain a monolayer film.

Cylinder Temperature:
Supply area: 175° C.
Compression area: melting point of modified EVOH or EVOH+30 to 45° C.
Measurement area: melting point of modified EVOH or EVOH+30 to 45° C.
Die temperature: melting point of modified EVOH or EVOH+30 to 45° C.
Screw rotation speed: from 40 to 100 rpm
Amount of throughput: from 0.4 to 1.5 kg/hour
Drawing roll temperature: 80° C.
Drawing roll speed: from 0.8 to 3.2 m/min.
Film thickness: from 20 to 150 um Measurement of Oxygen Transmission Rate The monolayer film having a thickness of 20 μm was moisture conditioned at 20° C. and 65% RH for three days, and after that, measurement ("OX-TORAN MODEL 2/21" manufactured by MOCON, Inc.) of the oxygen transmission rate was carried out in the same conditions. The results are shown in Table 1.

Examples 1-5

Preparation of Multilayer Film

Using the modified EVOH composition pellets obtained above (modified EVOH 1-5) as a core layer, a high density polyethylene (HDPE) (MI=0.01 g/10 min (at 190° C. under a load of 2160 g), 0.96 g/cm3) as outer layers, and an maleic anhydride-modified polyethylene {MI=0.2 g/10 min (at 190° C. under a load of 2160 g), "ADMER GT-6A" produced by Mitsui Chemicals, Inc.) as layers of the adhesive resin (b), a three-kind five-layer laminated material (HDPE/AD/Modified EVOH/AD/HDPE 90/10/20/10/90 μm) was produced by co-extrusion molding.

Determination of Fuel Permeability

The fuel barrier performance of the multilayer film obtained above against model fuels was measured using a flow-type gas/vapor permeability analyzer (GTR-30XFKE) manufactured by GTR Tech Corporation. The multilayer film was conditioned at 40° C. and 65% RH for 1 month and the measurement was conducted at 40° C. and 65% RH. The model fuel was CE10 which composition is toluene/isooctane/ethanol=45/45/10 wt %. The result is shown in Table 2.

Preparation of Rotational Molded Container

The modified EVOH composition pellets obtained above and a crosslinkable polyethylene pellet were pulverized to be about 35 mesh powder.

A multilayer container was made by using rotational molding equipment which can be biaxially rotated in oven or cooling chamber. Internal air temperature in the mold was monitored to control environmental temperature at which a polymer is exposed in the mold.

A crosslinkable polyethylene powder was introduced and then heated in the oven up to 130° C. to form a 2 mm thick outside layer of crosslinked polyethylene. The mold was taken out from the oven to load the modified EVOH powder for making a 1 mm thick middle layer as the barrier layer. The mold was heated again at the oven up to 175° C. and taken out. A crosslinkable polyethylene powder was loaded again and heated in the oven up to 130° C. to form a 2 mm thick inside layer.

In order to evaluate quality, the multilayer container was cut into equal two pieces for layer analysis. Four points were inspected by microscope to observe each layer thickness and appearance. From inspection each layer was well melted and sintered, and its thickness was even. The result is shown in Table 2.

A: Each layer was well melted and sintered, and its thickness was even.

B: Each layer was well melted and sintered, but its thickness was uneven.

C: Each layer was not well melted.

Comparative Example 1

Monolayer film, multilayer film and rotational molded container were prepared from Comparative EVOH 1 and evaluated in a same manner as Example 1. In the evaluation of quality of the rotational molded container, it is found that the EVOH layer and inside crosslinked polyethylene layer were not well formed due to insufficient melt of the EVOH powder. The results are shown in Table 2.

Comparative Examples 2-3

Monolayer film, multilayer film and rotational molded container were prepared from Comparative EVOH 2-3 and evaluated in a same manner as Comparative Example 1. The results are shown in Table 2.

In Examples 1-5, the modified EVOH 1-5 had excellent barrier performance and processability in combination with thermally crosslinkable polyethylene for multilayer barrier container by rotational molding process for reasons believed at least in part to be related to the relatively closer melt temperature of the modified EVOH to the melt temperature of thermally crosslinkable polyethylene.

On the other hand, while Comparative Examples 1 and 2 had excellent barrier performance, they had poor processability for reasons believed at least in part to be related to the relatively higher melt temperature of the EVOH.

In Comparative Example 3, melt temperature of the EVOH was lowered by increasing ethylene content for better processability, but in doing so there was a loss of barrier performance.

TABLE 1

| | | Resin composition | | | | | | |
|---|---|---|---|---|---|---|---|---|
| | | Ethylene content | Modification | | Structure in formula (I) | | Degree of Sapon. | Melting point | Melt flow rate 190° C./2160 g |
| | | mol % | Modifier | mol % | X | $R^1$ | mol % | ° C. | g/10 min |
| Ex 1 | Modified EVOH 1 | 38 | 1 | 2.5 | —CH2—OH | Direct bond | >99.9 | 152 | 3.9 |
| Ex 2 | Modified EVOH 2 | 38 | 1 | 1.5 | —CH2—OH | Direct bond | >99.9 | 160 | 6.5 |
| Ex 3 | Modified EVOH 3 | 38 | 1 | 1.5 | —CH2—OH | Direct bond | >99.9 | 160 | 2.0 |
| Ex 4 | Modified EVOH 4 | 44 | 1 | 1.0 | —CH2—OH | Direct bond | >99.9 | 154 | 2.0 |
| Ex 5 | Modified EVOH 5 | 38 | 2 | 2.3 | H | —O—CH(CH3)— | >99.9 | 153 | 1.5 |
| CEX 1 | EVOH 1 | 38 | — | 0 | — | — | >99.9 | 172 | 2.0 |
| CEX 2 | EVOH 2 | 44 | — | 0 | — | — | >99.9 | 165 | 5.5 |
| CEX 3 | EVOH 3 | 48 | — | 0 | — | — | >99.9 | 157 | 6.0 |

Modifier 1: 2-methylene-1,3-propanediol diacetate (MPDAc)
Modifier 2: Epoxypropane

TABLE 2

| | | Monolayer film Oxygen permeability 20° C./65% RH cc · 20 μm/ m2 · day · atm | Multilayer film Fuel permeability 40° C./65% RH g · 20 μm/ m2 · day | Quality of the rotational molded container |
|---|---|---|---|---|
| Ex 1 | Modified EVOH 1 | 0.4 | 3.5 | A |
| Ex 2 | Modified EVOH 2 | 0.5 | 3.9 | A |
| Ex 3 | Modified EVOH 3 | 0.5 | 3.8 | A |
| Ex 4 | Modified EVOH 4 | 1.8 | 11 | A |
| Ex 5 | Modified EVOH 5 | 1.5 | 9.5 | A |
| CEX 1 | EVOH 1 | 0.7 | 5.6 | C |
| CEX 2 | EVOH 2 | 1.5 | 11 | C |
| CEX 3 | EVOH 3 | 3.2 | 17 | A |

The invention claimed is:

1. A multilayer article obtained by a rotational molding process, the multilayer article comprising:
at least one layer of a thermally cured polymer composition (B); and
a seamless layer of a barrier polymer composition (A), wherein:
(i) the barrier polymer composition (A) consists of an ethylene-vinyl alcohol copolymer modified with a group containing at least one pendent primary hydroxyl group of formula(I);

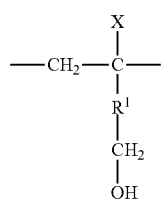

wherein X is selected from hydrogen a methyl group and a hydroxyalkyl group represented by the formula $R^2$—OH; and $R^1$ is selected from a direct bond and an alkylene group having a carbon number of from 1 to 9, and $R^2$ is selected from a direct bond, an alkylene group having a carbon number of from 1 to 9, and an alkyleneoxy group having a carbon number of from 1 to 9,
wherein the alkylene and alkyleneoxy group optionally contain one or more pendant hydroxyl groups, alkoxy groups and/or halogens and a compound selected from the group consisting of an alkali metal salt, a phosphoric acid compound, a boron compound and a mixture thereof,
wherein
an ethylene content of the modified ethylene-vinyl alcohol copolymer is from about 18 to about 55 mol %,
(ii) the melt temperature of the barrier polymer composition (A) is less than about 160° C.;
(iii) the thermally cured polymer composition (B) comprises a thermally cured polymer;

(iv) the thermally cured polymer composition comprises from about 0.001 wt % to about 1 wt % of one or more materials selected from the group consisting of a hydrotalcite compound, a hindered phenol-based heat stabilizer, a hindered amine-based heat stabilizer, and a metal salt of a higher fatty carboxylic acid; and wherein a monolayer film prepared from the barrier polymer composition (A) exhibits an oxygen permeability that is less than about 3.2cc, 20 micron/m².day.atm.

2. The multilayer article according to claim 1, wherein the modifying group containing at least one pendant primary hydroxyl group is represented by formula (II):

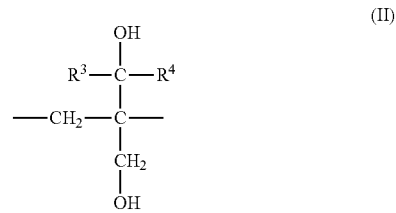

wherein $R^3$ and $R^4$ independently denote hydrogen or alkyl group, with $R^3$ and $R^4$ collectively having a carbon number of from 1 to 9.

3. The multilayer article according to claim 1, wherein the modifying group containing at least one pendant primary hydroxyl group is represented by formula (III):

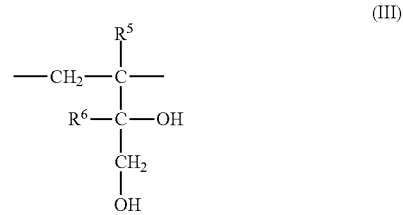

$R^5$ is X, and $R^6$ is selected from hydrogen, an alkyl group having a carbon number of from 1 to 8, and an alkoxy group having a carbon number of from 1 to 8.

4. The multilayer article according to claim 1, wherein $R^1$ is a direct bond and X is a hydroxymethyl group.

5. The multilayer article according to claim 4, wherein the content of the modified group based on the total monomer units is from about 0.05 to about 20 mol %.

6. The multilayer article according to claim 1, wherein $R^1$ is hydroxymethylene and X is hydrogen.

7. The multilayer article according to claim 6, wherein the content of the modified group based on total monomer units is from about 0.1 to about 20 mol %.

8. The multilayer article according to claim 1, wherein $R^1$ is methyloxymethylene and X is hydrogen.

9. The multilayer article according to claim 8, wherein the content of the modified group based on total monomer units is from about 0.1 to about 20 mol %.

10. The multilayer article according to claim 1, wherein the melt flow rate at 190° C., and 2160 g load of the modified ethylene-vinyl alcohol copolymer is about 4.2 g/10 minutes or more.

11. The multilayer article of claim 1, wherein the thermally cured polymer (B) is a thermally crosslinked polyethylene.

12. The multilayer article of claim 1, having one of the following structures:

Three layers: B/A/B, B/A/O, O/A/B

Four layers: B/A/O/B, B/O/A/B, B/A/B/O, O/B/A/B, O/A/O/B

Five layers: B/O/A/O/B, B/A/B/A/B, O/B/A/B/O wherein A represents a layer of barrier polymer composition (A), B represents a layer of thermally cured polymer composition (B), O represents an other layer, the leftmost layer is the innermost layer, and the rightmost layer is the outermost layer.

13. The multilayer article of claim 12, wherein the other layer O is an adhesive layer.

14. The multilayer article of claim 1, wherein the thickness of the multilayer article is from about 15 μm to about 20 mm.

15. The multilayer article of claim 1, wherein (i) the thickness of the layer of barrier polymer composition (A) is from about 1 μm to about 2 mm, or (ii) the thickness the layer of thermally cured polymer composition is from about 5 μm to about 15 mm, or (iii) both (i) and (ii).

16. A fuel container which is a multilayer article obtained by a rotational molding process, the multilayer article comprising:

at least one layer of a thermally cured polymer composition (B); and a seamless layer of a barrier polymer composition (A), wherein:

(i) the barrier polymer composition (A) consists of an ethylene-vinyl alcohol copolymer modified with a group containing at least one pendent primary hydroxyl group of formula(I);

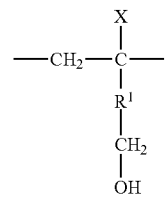

wherein X is selected from hydrogen a methyl group and a hydroxyalkyl group represented by the formula $R^2$—OH; and $R^1$ is selected from a direct bond and an alkylene group having a carbon number of from 1 to 9, and $R^2$ is selected from a direct bond, an alkylene group having a carbon number of from 1 to 9, and an alkyleneoxy group having a carbon number of from 1 to 9, wherein the alkylene and alkyleneoxy group optionally contain one or more pendant hydroxyl groups, alkoxy groups and/or halogens and a compound selected from the group consisting of an alkali metal salt, a phosphoric acid compound, a boron compound and a mixture thereof, wherein the modified ethylene-vinyl alcohol copolymer comprises: (a) an ethylene content from about 18 to about 55 mol %;

(ii) the melt temperature of the barrier polymer composition (A) is less than about 160° C.;

(iii) the thermally cured polymer composition (B) comprises a thermally cured polymer;

(iv) the thermally cured polymer composition comprises from about 0.001 wt % to about 1 wt % of one or more materials selected from the group consisting of a hydrotalcite compound, a hindered phenol-based heat stabilizer, a hindered amine-based heat stabilizer, and a metal salt of a higher fatty carboxylic acid; and wherein a monolayer film prepared from the barrier polymer composition (A) exhibits an oxygen permeability that is less than about 3.2cc, 20 micron/$m^2$.day.atm.

* * * * *